(12) United States Patent
Hofer et al.

(10) Patent No.: US 10,493,830 B2
(45) Date of Patent: Dec. 3, 2019

(54) VEHICLE DOOR

(71) Applicant: MAGNA STEYR Fahrzeugtechnik AG & Co KG, Graz (AT)

(72) Inventors: Bernhard Hofer, Graz (AT); Peter Trummer, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 15/671,697

(22) Filed: Aug. 8, 2017

(65) Prior Publication Data

US 2018/0111456 A1 Apr. 26, 2018

(30) Foreign Application Priority Data

Oct. 21, 2016 (EP) .................................... 16195040

(51) Int. Cl.
*B60J 5/04* (2006.01)
*B60J 5/10* (2006.01)
*B60R 13/02* (2006.01)

(52) U.S. Cl.
CPC ............. *B60J 5/107* (2013.01); *B60J 5/0413* (2013.01); *B60J 5/0463* (2013.01); *B60J 5/0455* (2013.01); *B60J 5/0481* (2013.01); *B60R 13/0243* (2013.01); *B60Y 2304/03* (2013.01); *B60Y 2304/05* (2013.01); *B60Y 2306/01* (2013.01); *B60Y 2410/121* (2013.01); *B60Y 2410/122* (2013.01)

(58) Field of Classification Search
CPC ........ B60J 5/107; B60J 5/0413; B60J 5/0463; B60J 5/0455; B60J 5/0481; B60J 5/0484; B60J 5/10

USPC ...................................................... 296/146.8
See application file for complete search history.

(56) References Cited

U.S. PATENT DOCUMENTS

| | | | | |
|---|---|---|---|---|
| 5,449,213 A | * | 9/1995 | Kiley ....................... | B60J 5/101 296/146.5 |
| 5,536,060 A | | 7/1996 | Moinuddin et al. | |
| 5,876,086 A | * | 3/1999 | Lagrou .................... | B60J 5/101 296/146.11 |
| 6,053,562 A | * | 4/2000 | Bednarski ............... | B60J 5/101 296/146.1 |
| 6,302,474 B1 | * | 10/2001 | Drysdale ................ | B60J 5/0441 296/146.6 |
| 2001/0013710 A1 | * | 8/2001 | Pommeret ............... | B60J 5/101 296/57.1 |
| 2003/0107235 A1 | * | 6/2003 | Komatsu ................ | B60J 5/0405 296/146.5 |
| 2005/0150166 A1 | | 7/2005 | Seksaria et al. | |

(Continued)

FOREIGN PATENT DOCUMENTS

DE 4432381 A1 3/1996
DE 102007032143 A1 1/2009

(Continued)

*Primary Examiner* — Gregory A Blankenship
(74) *Attorney, Agent, or Firm* — Jordan IP Law, LLC; Todd A. Vaughn

(57) ABSTRACT

A vehicle door for a motor vehicle, including a support structure, an inner shell fixed to the support structure, and an outer panelling fixed to the inner shell. The inner shell is formed and connected to the support structure in such a way that it is a load-bearing component, thereby increasing the overall rigidity of the vehicle door.

16 Claims, 3 Drawing Sheets

(56) References Cited

U.S. PATENT DOCUMENTS

| | | | |
|---|---|---|---|
| 2007/0125003 A1* | 6/2007 | Wartzack | B60J 5/0405 49/502 |
| 2009/0056230 A1* | 3/2009 | Flendrig | B60J 5/0405 49/502 |
| 2009/0066113 A1* | 3/2009 | Kiriakou | B60J 1/20 296/146.15 |
| 2010/0019522 A1* | 1/2010 | Nakamura | B60J 5/107 296/50 |
| 2010/0052360 A1* | 3/2010 | Hsu | B60J 5/0437 296/146.6 |
| 2012/0306231 A1* | 12/2012 | Ginestet | B60J 5/101 296/76 |
| 2014/0265414 A1* | 9/2014 | Patterson | B60J 5/107 296/50 |
| 2015/0352932 A1* | 12/2015 | Mildner | B60J 5/0429 296/193.05 |
| 2015/0352934 A1* | 12/2015 | Mildner | B60J 5/102 296/146.5 |
| 2016/0114662 A1* | 4/2016 | Yamaguchi | B60J 5/103 296/146.8 |
| 2016/0176272 A1* | 6/2016 | Rejc | B60J 5/107 296/146.5 |
| 2016/0229464 A1 | 8/2016 | Yoshinori et al. | |
| 2016/0375747 A1* | 12/2016 | Kawashima | B60J 5/101 49/475.1 |
| 2017/0066306 A1* | 3/2017 | Ueno | B60J 5/101 |
| 2017/0174057 A1* | 6/2017 | Miyake | B60J 5/107 |
| 2017/0174058 A1* | 6/2017 | Miyake | B60J 5/107 |
| 2017/0174059 A1* | 6/2017 | Miyake | B60J 10/86 |
| 2017/0361689 A1* | 12/2017 | Costa | B62D 35/007 |
| 2018/0111456 A1* | 4/2018 | Hofer | B60J 5/107 |
| 2018/0186220 A1* | 7/2018 | Leterrier | B60R 13/0243 |

FOREIGN PATENT DOCUMENTS

| | | |
|---|---|---|
| EP | 0739769 A2 | 10/1996 |
| WO | 2015015930 A2 | 2/2015 |

\* cited by examiner

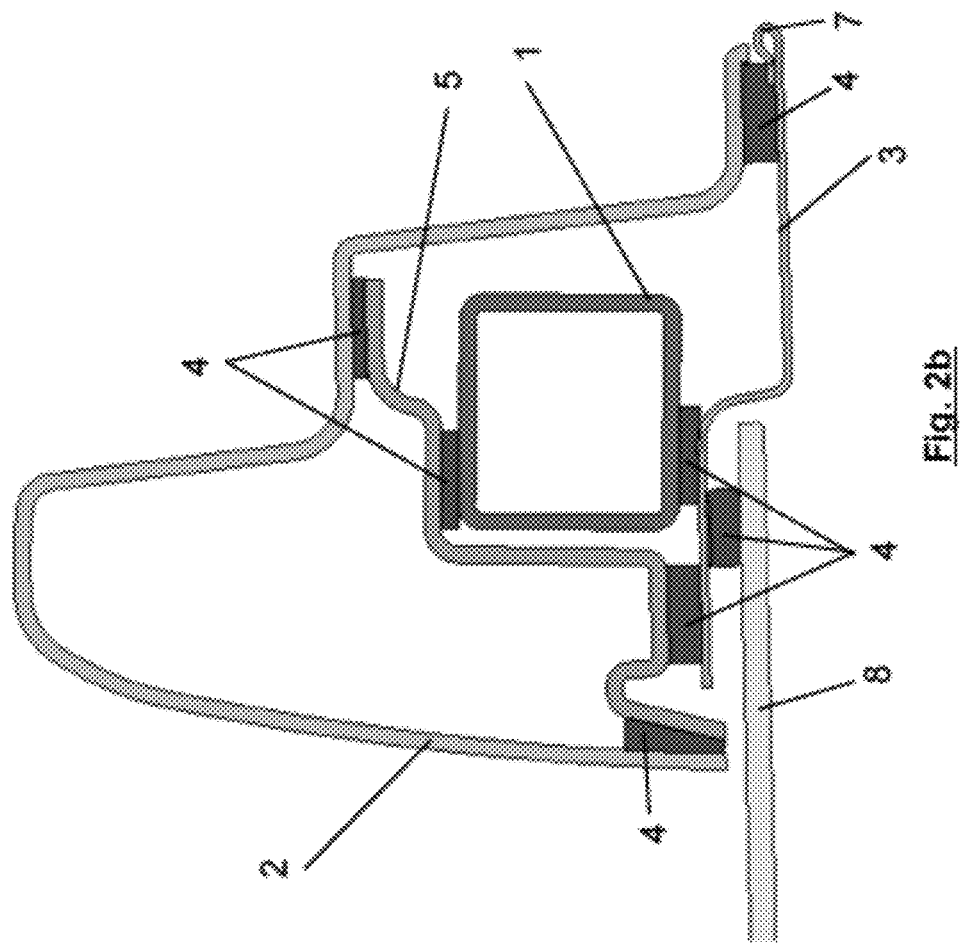
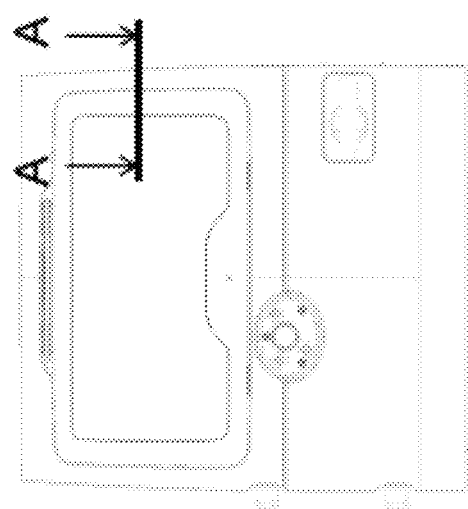

VEHICLE DOOR

CROSS-REFERENCE TO RELATED APPLICATIONS

The present application claims priority 35 U.S.C. § 119 to European Patent Publication No. EP EP16195040.7 (filed on Oct. 21, 2016), which is hereby incorporated by reference in its entirety.

TECHNICAL FIELD

Embodiments relate to a vehicle door for a motor vehicle, comprising a support structure, an inner shell, and an outer panelling.

BACKGROUND

A vehicle door construction via panelling parts, in particular, an inner panelling, also referred to as an inner shell, and an outer panelling is known in the art, the panelling parts being detachably or permanently fixed to a support structure.

DE 102 55 985 A1, for example, discloses a device for connecting the outer panelling to the support structure of a vehicle door, via a carrier element permanently connected to the outer panelling and detachably connected to the support structure.

EP 3 000 637 A1 discloses a vehicle door for a motor vehicle, comprising at least one thermoformed panelling part and a support structure as carrier for the panelling part, a mount being fixed to the panelling part, the mount engaging in a formation of the support structure or in a support element fixed to the support structure, so that the panelling part is able to slide on the formation or the support element in a direction perpendicular to the direction of engagement.

EP 2 006 134 A1 discloses a vehicle door having an outer and an inner door panel, an interior trim module being fixed to the inner door panel.

The known panelling parts are usually fixed to a load-bearing frame, which must ensure the rigidity of the motor vehicle in the area of the vehicle door. The panelling parts, above all the inner panelling part with its fittings, usually have a negative effect on this rigidity, since their attached mass has also to be supported by the support frame.

SUMMARY

Embodiments relate to a vehicle door for a motor vehicle which is easy and cost-effective to produce and at the same time ensures a high degree of rigidity for a low weight.

In accordance with embodiments, a vehicle door for a motor vehicle may comprise a support structure, an inner shell, and an outer panelling, the inner shell being fixed to the support structure and the outer panelling being fixed to the inner shell, the inner shell being formed and connected to the support structure in such a way that it is a load-bearing component increasing the rigidity of the vehicle door.

In accordance with embodiments, the inner shell of the vehicle door is not merely hung or clamped into a support structure, as is usual for plastic panellings, or simply screwed, as is done for metal panellings for fixing to the support structure. Instead, the inner panelling, on the one hand, being of such rigidity and size, and on the other hand, having such a secure fixing to the support structure, that not only does the inner shell not impose a load on the support structure, it increases the rigidity of the vehicle door.

As a result, the support structure itself may be designed with smaller dimensions and the load-bearing inner shell can be endowed with further functions, so that overall a cost-effective construction is afforded.

In accordance with embodiments, the support structure, in particular, may be part of a so-called space-frame structure.

In accordance with embodiments, the outer panelling may also be formed as a load-bearing component, which, in addition to the inner shell, further increases the rigidity of the vehicle door.

In accordance with embodiments, the inner shell may be a plastic component, such as, for example, a thermoformed plastic component. This gives the vehicle door a low weight. The tooling costs for manufacture of the panelling are low. In particular, if thermoformed, thermoplastic plastic sheets are used, the inner shell may also fulfil the visual requirements demanded of an inner panelling visible from inside the vehicle.

In accordance with embodiments, the inner shell may form the surface of the vehicle door visible from inside. In particular, the inner shell may already have a desired colour and/or grain and may be formed as a coloured, thermoformed, thermoplastic plastic sheet.

In accordance with embodiments, alternatively, injected components or compression-moulded components, for example, an injection-moulded component or compression-moulded part, and also fibre-reinforced components, may also be used for the inner shell.

In accordance with embodiments, the inner shell may extend substantially over the entire height and/or the entire width of the vehicle door.

In accordance with embodiments, the inner shell may extend substantially over half the width of the vehicle door, particularly if it is embodied as a wing door with door halves arranged on the left and on the right.

In accordance with embodiments, the vehicle door may be a side door of a vehicle, but also, in particular, a rear door of a vehicle.

In accordance with embodiments, the inner shell may be fixed to the support structure through adhesive bonding via an elastic adhesive. The layer thickness of the adhesive may be more preferably between 2 mm and 5 mm, so that different rates of thermal expansion compared to the support structure, for example, can be compensated for.

In accordance with embodiments, the inner shell may in particular form the interior trim of the vehicle door, which includes scope for forming at least parts of the interior trim from the inner shell itself.

In accordance with embodiments, the outer panelling is a metal component. This makes it possible to achieve a good, conventional gap formation against an outer panelling, since a metal part has a lower thermal expansion than plastic parts. The outer panelling, however, may also be designed as a plastic component or fibre-plastic composite component.

In accordance with embodiments, only the outer shell then needs to go through a painting process. The space-frame, that is to say the support structure, may be coated by cathodic dip painting in order to ensure a secure adhesive bonding and to prevent corrosion.

Despite an alternative construction, the metal outer shell means that the visual impression and "feel" of a conventional panelling is retained.

In accordance with embodiments, one or more reinforcing elements may be arranged at least in some areas between the inner shell and the support structure. The surfaces of such reinforcing elements should not run parallel to the surface of the inner shell, that is to say, they do not simply form additional layers of the panelling but rather a structure of their own. The reinforcing assembly can also be made load-bearing via adhesively bonded connections to the support structure and the inner shell.

In accordance with embodiments, an openable or detachable access panel is preferably fitted to the face of the inner shell facing the vehicle interior, in order to afford access to an installation space. The installation space may be situated, in particular, in the cavity between the inner shell and the outer panelling. The access panel allows easy access to components fitted in the installation space, such as, for example, a lock, wiring harness or wiper motor. The access panel may be detachably fitted via Velcro fastenings, such as dual-lock Velcro fastenings, for example, or via clip connections.

In accordance with embodiments, the outer panelling may be connected together with the inner shell in the area of their respective outer edges, in particular, adhesively bonded, and preferably bonded all round, so that no separate sealing, such as a conventional PVC-seam sealing, is necessary.

The outer panelling is more preferably flanged all round in the area of its outer edge, the flanging may be sealed by the adhesive bonding of the outer panelling to the inner shell.

In accordance with embodiments, a fixed window pane as a viewing window may be adhesively bonded onto the outer panelling.

DRAWINGS

Embodiments will be illustrated by way of example in the drawings and explained in the description below.

FIG. 2a illustrates a view of the vehicle door of FIG. 1 from behind in the direction of travel of a motor vehicle, and shows the position of the section A-A.

FIG. 2b illustrates a sectional view of a vehicle door corresponding to A-A of FIG. 2a.

FIG. 3a illustrates a view of a vehicle door corresponding to FIG. 2a.

FIG. 3b illustrates a sectional view of vehicle door corresponding to B-B of FIG. 3a.

DESCRIPTION

Figure 1:
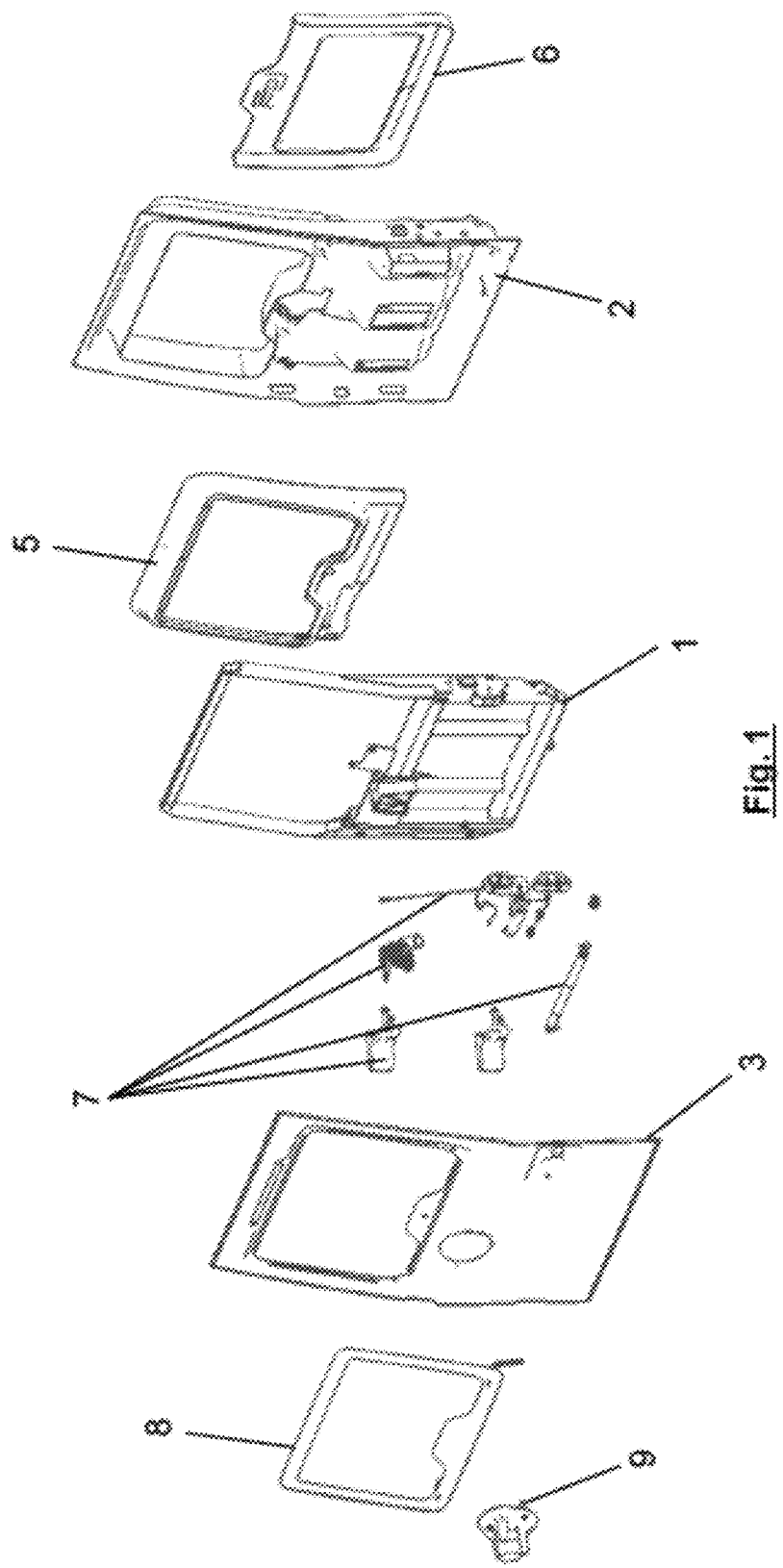
FIG. 1 illustrates a three-dimensional exploded view, which shows components of a vehicle door, in accordance with embodiments.

FIG. 1 in an exploded view shows the components of a vehicle door in accordance with embodiments. The vehicle door comprises a support structure 1, which forms a part of a space-frame structure of a vehicle door, an inner shell 2, and an outer panelling 3. The support structure 1, the inner shell 2, and the outer panelling 3 are of approximately equal size, the inner shell 2 and the outer panelling 3 being configured to extend slightly beyond the support structure 1. The support structure 1, the inner shell 2, and the outer panelling 3 are configured to have a similar, substantially rectangular geometry, including an opening for a window pane being left free above half-height in the upper halves of each of the rectangles. The inner shell 2 is fixed to the support structure 1 via a plurality of flat, adhesively bonded connections. The outer panelling 3 may be fixed to the inner shell 2 likewise via extensive bonding, and in addition, in some areas may also be adhesively bonded directly to the support structure 1 (as represented in the detail in FIGS. 2b and 3b).

Because of this formation, and sufficiently strong adhesive bonding to the support structure 1, the inner shell 2 and the outer panelling 3 comprise load-bearing components, which serve to increase the overall rigidity of the vehicle door.

The inner shell 2 is a coloured, thermoformed, thermoplastic plastic component. The inner shell 2 extends substantially over the entire height and the entire width of a door wing of the vehicle door. The inner shell 2 is so formed that it simultaneously constitutes the interior trim of the vehicle door. The inner shell 2 also forms the coloured surface of the vehicle door visible from inside.

Figure 3B:
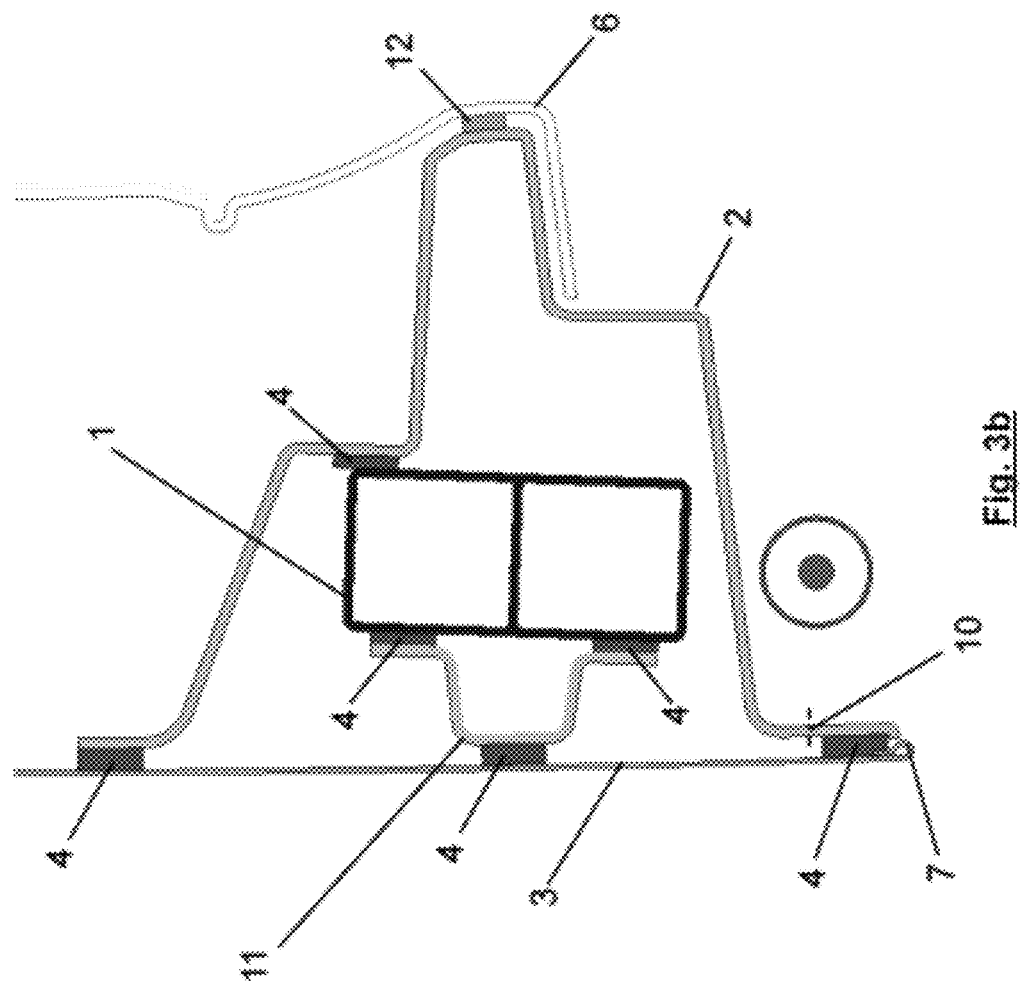
Figure 3A:
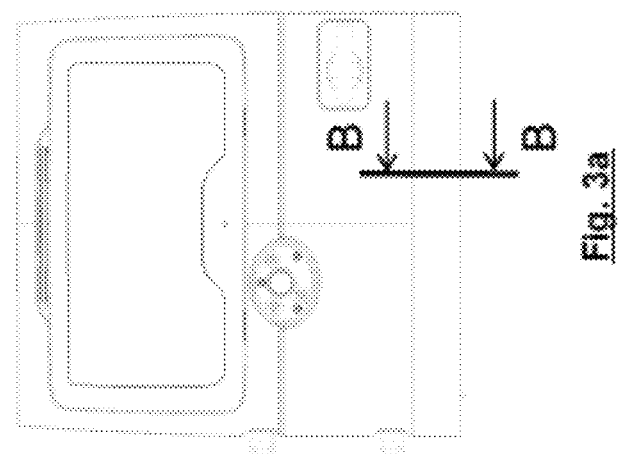

In some areas between the inner shell 2 and the support structure 1, a reinforcing element 5 may be arranged. The reinforcing element 5 may have a substantially rectangular frame shape which is arranged around the window pane opening, also present in the inner shell 2 and the outer panelling 3. The reinforcing element 5 is not formed parallel to the surface of the inner shell 2, and therefore, does not comprise a further layer of the inner shell 2. The reinforcing element 5 has a three-dimensional structure of is own, which forms braces between the support structure 1 and the inner shell 2 and the outer panelling 3 (as is represented in FIGS. 3a and 3b).

An access panel 6 may be fixed to the face of the inner shell 2 facing the vehicle interior, the access panel 6 affording access to an installation space between the inner shell 2 and the outer panelling 3. With the access panel 6 in an open state, assembly components 7 may easily be fitted, serviced, and replaced between the inner shell 2 and the outer panelling 3.

The outer panelling 3 is designed as a metal component, the metal component being adhesively bonded to the inner shell 2 at the periphery thereof. The low gap widths on the outer panelling 3 usual in conventional door structures may thereby be achieved.

A window pane 8 may be fixed to the frame of the window opening in the outer panelling part 3, in particular, by adhesive bonding.

A spare-wheel carrier 9 may furthermore be mounted on the outside of the support structure 1.

FIG. 2a illustrates a view of a vehicle door in accordance with embodiments from behind in the direction of travel of a motor vehicle and at the same time the position of the section A-A, which is represented in FIG. 2b.

As illustrated in FIG. 2b, the inner shell 2 is fixed by bonding with an elastic adhesive 4 to the support structure 1, embodied as a square profile, the fixing being made indirectly via a reinforcing element 5, which in turn is adhesively bonded directly to the inner shell 2 and to the support structure 1.

The outer panelling 3 is adhesively bonded via elastic adhesive 4 directly to both the inner shell 2 and the support structure 1 and the reinforcing element 5. The layer thickness of the adhesive 4 is between 2 mm and 5 mm, to enable absorption of different rates of thermal expansion. A window pane 8 is likewise adhesively bonded to the outer panelling 3.

FIG. 3b illustrates in detail the sectional area B-B marked in FIG. 3a. FIG. 3b illustrates, as does FIG. 2b, that the outer panelling 3 is adhesively bonded together with the inner shell 2 all round in the area of their respective outer edges, so that no further external sealing is necessary. In this radial end area of the outer panelling 3 and the inner shell 2, the outer panelling 3 is inwardly flanged all round in the area of its outer edge, this flanging 7 being sealed by adhesively bonding the outer panelling 3 to the inner shell 2 via adhesive 4. Just above this sealing via adhesive 4, at the bottom edge of the inner shell 2 and of the outer panelling part 3, a condensation water drain 10 is provided in the form of multiple holes.

The outer panelling part 3 may optionally be fixed to the support structure 1 by way of a further reinforcing part, namely the brace 11, the brace 11 being adhesively bonded via adhesive 4 both to the outer panelling part 3 and to the support structure 1. The access panel 6 is detachably fixed to the inner shell 2 via a Velcro fastening 12.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE NUMERALS 1 support structure
2 inner shell
3 outer panelling
4 adhesive
5 reinforcing element
6 access panel
7 assembly components
8 window pane
9 spare-wheel carrier
10 condensation water drain
11 brace
12 Velcro fastening

What is claimed is:

1. A vehicle door for a motor vehicle, comprising:
a support member having a space-frame structure;
an inner shell configured to be fixed to the support structure to serve as a load-bearing component of the vehicle door, the inner shell being configured to extend substantially over the entire height of the vehicle door;
an outer panelling fixed directly to the inner shell via a plurality of adhesively bonded connections, the outer panelling and the inner shell being connected to each other in an area of their respective outer edges; and
a reinforcing element arranged at least in some areas between the inner shell and the support member.

2. The vehicle door of claim 1, wherein the inner shell comprises one of a thermoformed plastic component, an injection-moulded component, or a compression-moulded part.

3. The vehicle door of claim 1, wherein the inner shell is configured to extend substantially over the entire height and half the width of the vehicle door.

4. The vehicle door of claim 1, wherein the inner shell is configured to be fixed to the support member through adhesive bonding via an elastic adhesive.

5. The vehicle door of claim 4, wherein the thickness of the elastic adhesive is between a range of 2 mm and 5 mm.

6. The vehicle door of claim 1, wherein the inner shell forms the interior trim of the vehicle door.

7. The vehicle door of claim 1, wherein the inner shell forms a surface of the vehicle door which is visible from inside of the motor vehicle.

8. The vehicle door of claim 1, wherein the reinforcing element has a surface which is not formed continuously parallel to a surface of the inner shell.

9. The vehicle door of claim 1, further comprising a detachable access panel fitted to a face of the inner shell facing an interior of the motor vehicle, in order.

10. The vehicle door of claim 9, wherein the access panel is detachably connected to the inner shell to permit to access to an installation space when in an opened state.

11. The vehicle door of claim 1, wherein the outer panelling comprises a metal material.

12. The vehicle door of claim 1, wherein the outer panelling and the inner shell are connected via adhesive bond, which is to further serve as a seal.

13. The vehicle door of claim 1, wherein the outer panelling is flanged all round an outer edge thereof.

14. The vehicle door of claim 13, the flanging is sealed by adhesive bond of the outer panelling to the inner shell.

15. A vehicle door for a motor vehicle, comprising:
a support member having a space-frame structure;
an inner shell configured to be fixed to the support structure to serve as a load-bearing component of the vehicle door, the inner shell to be fixed indirectly to the support structure via a first plurality of adhesively bonded connections;
an outer panelling configured to be fixed directly to the inner shell and the support structure via a second plurality of adhesively bonded connections; and
a reinforcing element configured to be arranged between the inner shell and the support structure and also between the inner shell and the outer panelling, the reinforcing element configured to be fixed directly to the support structure, the inner shell, and the outer panelling via a third plurality of adhesively bonded connections, wherein the inner shell is fixed indirectly to the support structure via the reinforcing element.

16. A vehicle door for a motor vehicle, comprising:
a support member having a space-frame structure;
an inner shell configured to be fixed to the support structure to serve as a load bearing component of the vehicle door, the inner shell to be fixed indirectly to the support structure via a first plurality of adhesively bonded connections;
an outer panelling configured to be fixed directly to the inner shell and the support structure at a first region of the vehicle door via a second plurality of adhesively bonded connections;
a first reinforcing element configured to be arranged between the inner shell and the support structure and also between the inner shell and the outer panelling, the first reinforcing element configured to be fixed directly to the support structure, the inner shell, and the outer panelling via a third plurality of adhesively bonded connections, wherein the inner shell is fixed indirectly to the support structure via the first reinforcing element; and a second reinforcing element arranged configured to be arranged between the outer panelling and the support structure to fix the outer panelling part indirectly to the support structure at a second region of the vehicle door via a fourth plurality of adhesively bonded connections.

* * * * *